(No Model.)
J. T. LEMAIRE.
FEEDING MECHANISM FOR CARDING MACHINES.
No. 333,869. Patented Jan. 5, 1886.
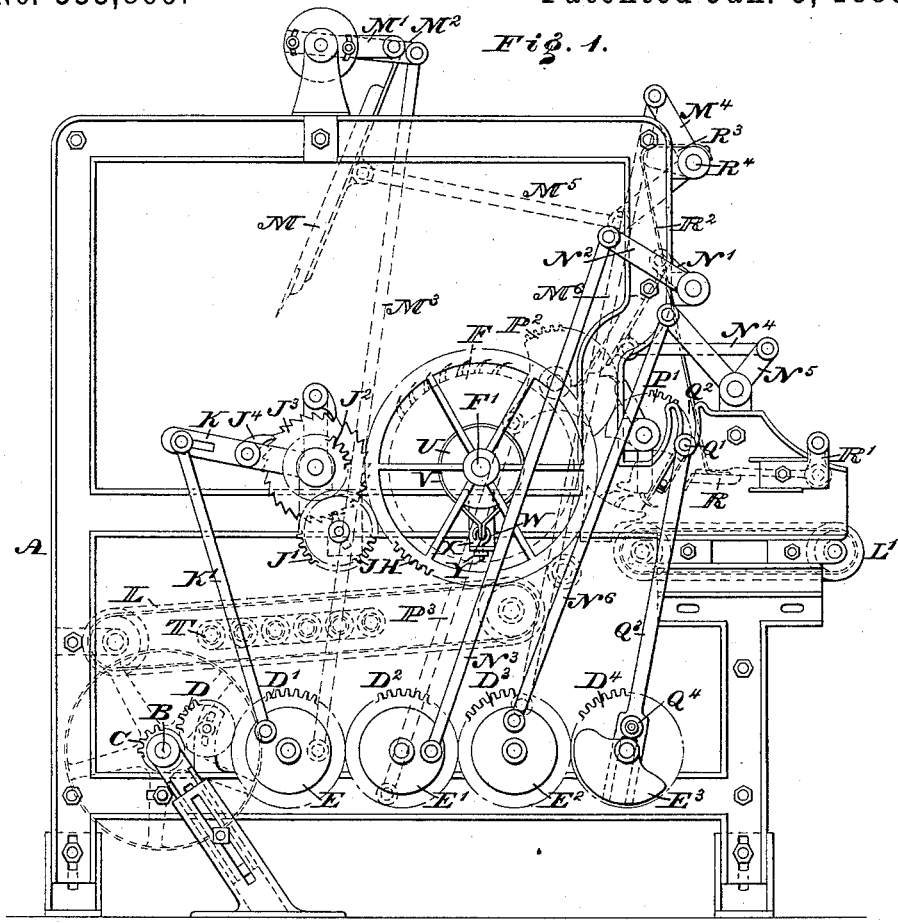
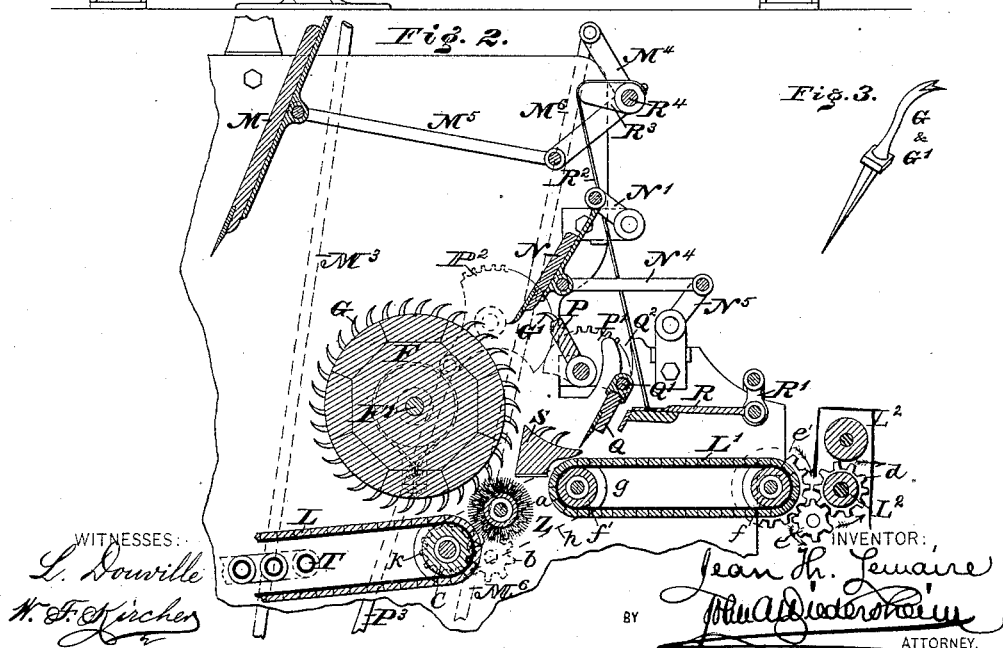
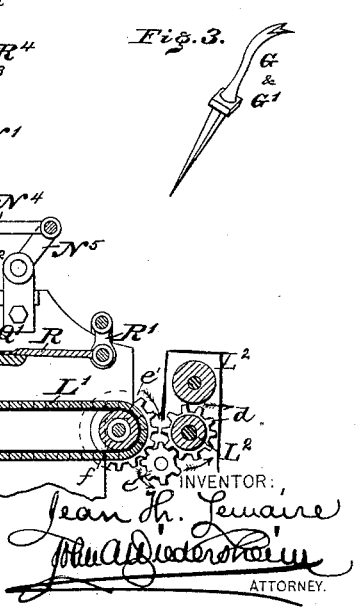
WITNESSES:
L. Douville
W. F. Kircher
INVENTOR:
Jean T. Lemaire
BY John A. Wiederscheim
ATTORNEY.
N. PETERS, Photo-Lithographer, Washington, D. C.

UNITED STATES PATENT OFFICE.

JEAN THOMAS LEMAIRE, OF PHILADELPHIA, PENNSYLVANIA, ASSIGNOR TO JEROME CARTY, OF SAME PLACE.

FEEDING MECHANISM FOR CARDING-MACHINES.

SPECIFICATION forming part of Letters Patent No. 333,869, dated January 5, 1886.

Application filed April 29, 1885. Serial No. 163,844. (No model.) Patented in Germany June 8, 1880, No. 13,130, July 16, 1881, No. 17,038, July 4, 1882, No. 20,456, December 28, 1882, No. 23,498, and April 27, 1883, No. 24,527.

*To all whom it may concern:*

Be it known that I, JEAN THOMAS LEMAIRE, a subject of the King of Belgium, residing in the city and county of Philadelphia, State of Pennsylvania, have invented a new and useful Improvement in Feeding Mechanism for Carding-Machines, which improvement is fully set forth in the following specification and accompanying drawings, in which—

Figure 1 represents a side elevation of a feeding apparatus for carding-machines embodying my invention. Fig. 2 represents a vertical section of a portion thereof. Fig. 3 represents a perspective view of a tooth employed for the feed-drum and one of the combs.

Similar letters of reference indicate corresponding parts in the several figures.

My invention consists of a feeding apparatus for carding-machines having the following characteristics: a feed-drum to which intermittent motion is imparted, the teeth of the feed-drum and comb having split working portions; a brake for the feed-drum; a comb operating with variable speed; a rising and falling comb; a holder for the carded material; a brush for the feed apron and drum; the feed and discharge aprons, independent of each other, and a heater in the feed-apron.

Referring to the drawings, A represents the frame of the machine, and B represents a driving-shaft mounted thereon, carrying a pinion, C, by which motion is imparted to a pinion, D, and consequently to a number of toothed wheels, $D'$, $D^2$, $D^3$, and $D^4$, the shafts of said pinions and wheels being properly mounted on the frame A.

E $E'$ $E^2$ represent disk-cranks secured, respectively, to the shafts of the wheels $D'$, $D^2$, and $D^3$, and $E^3$ represents a cam secured to the shaft of the wheel $D^4$.

F represents a feed-drum having teeth G, and secured to a shaft, $F'$, which is mounted on the frame A and carries a toothed wheel, H, with which gears a pinion, J, the shaft whereof carries a pinion, $J'$, which gears with a pinion, $J^2$, whose shaft carries a ratchet, $J^3$, with which engages a pawl, $J^4$, the arm K, which supports the latter, being connected with an arm, $K'$, the lower end whereof is attached to a wrist pin or stud on one of the cranks, E, the effect of all of which is to impart intermittent motion to the feed-drum.

Located below the drum F, at the feed end of the machine, is an apron, L, for directing wool, &c., to the drum F, and at the opposite end of the machine an apron, $L'$, for discharging the combed wool, &c., as will be hereinafter more fully referred to.

$L^2$ represents the feed-rollers, which direct the combed wool from the apron $L'$ to the carding-machine. On the shaft of one of said rollers is mounted a pinion, $d$, which meshes with an idler-pinion, $e$. On the shaft of the roller $f$, around which the apron $L'$ passes, is a pinion, $e'$, which meshes with the idler $e$, whereby motion is communicated to the said apron. The shaft of the other roller, $f'$, carries a spur-wheel, $g$, around which passes a chain, belt, or band, $h$, which also engages a spur-wheel, $k$, on the shaft of the roller $c$, whereby the apron L receives motion from the apron $L'$.

M N P represent combs which are located on the machine adjacent to the feed-drum, and operated as follows: The comb M is located above the feed-drum and somewhat in front of the same, and is pivoted to and operated by a rising and falling arm, $M'$, which is mounted at the top of the frame A and receives motion by means of an arm, $M^2$, and a rod, $M^3$, the lower end of the latter being connected with a wrist pin or stud on one of the disk-cranks, E. An elbow-lever, $M^4$, is also mounted at the top of the frame A on the rear of the comb M, and pivoted to said comb by means of a rod, $M^5$, and is furthermore pivoted to a rod, $M^6$, which in both figures is shown by dotted lines, and has its lower end connected with a wrist pin or stud on one of the cranks, $E^2$, by which means horizontal motions in opposite directions are imparted to the comb M, and as the latter is raised and lowered by the arm $M'$, as hereinbefore stated, the comb has elliptical motions imparted to it. The comb M is located somewhat above the drum, at the rear thereof, and consequently at the rear of the comb M, and pivoted to an arm, $N'$, which is mounted on the frame A, and receives motion by means of an arm, $N^2$, and a rod, $N^3$, the lower end of the latter being connected with a wrist pin or stud on one of the cranks, E', the effect of which is to raise and lower the comb N. Pivoted to the back of said comb is an arm, N⁴, which has connected with its shaft an elbow-lever, N⁵, which, by means of a rod or bar, N⁶, attached to a wrist pin or stud on a crank, E², imparts horizontal motions in opposite directions to the comb, so that the latter has elliptical motions imparted to it. The comb P is located below the comb N, and has connected with its shaft a toothed segment, P', with which meshes a toothed segment, P², which is mounted on the frame A, said segments having eccentric axes, whereby the comb P is rotated with variable speed, first rapidly and then slow, to the end of the motion, the segment P² receiving rotary motions in opposite directions by means of a rod or bar, P³, whose lower end is mounted on a wrist pin or stud on one of the cranks, E'.

Q represents a rising and falling stripping-comb, which, located below and rearward of the comb P, has its shaft Q' fitted in a curved slot, Q², and connected with a rod, Q³, whose lower end carries a roller or stud, Q⁴, the latter bearing on the cam E³ on the shaft of the toothed wheel D⁴, whereby rising and falling motions are imparted to the comb Q.

R represents a holder which is pivoted to a link, R', the latter being suitably mounted on the frame above the discharge-apron L', said holder consisting of a piece of board or other suitable material having at front a downwardly-projecting lip. Connected with the holder is a strap, R², whose upper end is attached to an arm, R³, the latter being secured to the shaft R⁴, on which the arm or lever M⁴ is supported.

Located in front of the apron L' and below the combs P Q is a stationary comb, S, so disposed that the teeth of the comb P pass between those of said comb S. The teeth G of the feed-drum and those G' of the comb P are forked, whereby they take unfailing hold of the wool, &c., to be combed.

Within the apron L are pipes T, which are connected, as is usual in steam-fitting, with return-bends supported on the frame of the apparatus, and which are in communication with a supply of steam or other medium for heating the apron, and consequently the wool, &c., thereon, said material, when in warm or hot condition, being most readily combed.

To the end of the feed-drum F or the shaft thereof is secured a pulley or ring, U, around which is passed a band, V, of metal or other suitable material, and to said band is attached a screw hook or eye, W, the threaded portion of which is passed through a bar, X, connected with the frame of the machine. A nut, Y, is fitted to the threaded portion of the hook or eye, whereby the tension of the band on the ring or pulley may be adjusted, and provision is made for holding the feed-drum when the same is relieved of power, thus preventing return motion thereof.

Z represents a brush located below the drum and at the rear end of the apron L, for purposes to be hereinafter explained, the same having its shaft provided with a pinion or spur wheel, $a$, meshing with an idler-pinion or spur-wheel, $b$, mounted on a stud on the frame of the machine, and meshing with a pinion, $k$, on the shaft of the roller $c$ of the apron L, as seen in Fig. 2, whereby said brush is properly rotated.

The operation is as follows: Power is applied to the shaft B, whereby the gear-wheels D', D², D³, and D⁴ are set in motion, and thus by means of the arms K' K, pawl J⁴, ratchet J³, pinions J² J' J, and wheel H intermittent rotary motion is imparted to the feed-drum F; consequently the wool, &c., supplied to the apron L and reaching the drum is taken up by the latter and held at intervals while being subjected to the combing operations, which will be described in their order. Owing to the connected mechanism of the combs M N P, the latter are operated, the comb M moving backward and forward in an elliptical motion, and it works against the wool, &c., raised by the drum, thus thinning and straightening out the same. The stream of material now reaches the comb N, where it is straightened and further thinned, and next subjected to the action of the oscillating comb P, whose teeth pass between the teeth of the drum, and thus nicely and uniformly combed, it being noticed that owing to the segmental gearing P' P² the motion of the comb P is at first rapid as it enters the stream of material, and then gradually at a less rapid rate as it completes its throw, so that the material is not injured as the combing operation advances and the material thins out, it being noticed that the combs N P move in reverse directions, so that the comb P acts against the material after it has been straightened out and thinned by the comb N, said comb P then drawing the material through the teeth of the drum, at which time the drum has its dwell. The stream of material is also carried through the teeth S by the comb P, and next stripped off said comb P, and then held by means of the descending comb Q, while the comb P returns to its first position toward the comb N. The holder R now descends and bears against the material on the apron L', so that the comb Q is permitted to rise, and the material is then carried away by the apron L', it being noticed that the holder R is permitted to move with the discharging material on the apron, owing to the link R', until the strap R² lifts said holder, in which case the holder is returned to its elevated position, ready to advance against the combed material continued to be fed to the apron L' by the comb P. Should any of the material on the feed-apron L pass under the drum and not be taken up by the teeth thereof, it will reach the brush Z and be driven by the same against the teeth of said drum, and thus returned to the stream of material properly fed to the drum. When the combs M N have completed their advance motions, they rise on their return motions. When the latter are completed, they re-enter the material and act thereon in the manner stated, it being noticed that on the return motions said combs do not interfere with the advancing material.

Having thus described my invention, what I claim as new, and desire to secure by Letters Patent, is—

1. A feed-drum and means, substantially as described, for imparting an intermittent rotary motion thereto, in combination with two combs having means for imparting an elliptical motion to the same, one of the said combs having a support above and in front of the said drum, and the other comb being also above but in the rear thereof, substantially as described.

2. The comb P, in combination with the comb Q, having a shaft, Q′, a holder, a drum, a frame having curved slots, a rod pivotally secured to said shaft, and means, substantially as described, for imparting a rising and falling motion to said rod, and for operating the said comb P, substantially as and for the purpose set forth.

3. The drum F, with means for rotating the same, in combination with the comb Q, comb P, located between the comb Q and drum F, a support for the material below said comb Q, means, substantially as described, for oscillating said comb P, and means for imparting a rising and falling motion to said comb Q, substantially as and for the purpose set forth.

4. A discharge-apron, in combination with a holder, a comb, and means, substantially as described, for imparting a rising and falling motion to said comb, and for imparting motion to said apron, substantially as and for the purpose set forth.

5. The comb P, and means, substantially as described, for oscillating the same, and for imparting a variable speed during each oscillation thereof, in combination with the stripping-comb Q, a holder, a delivery-apron, and means, substantially as described, for imparting a rising and falling motion to said comb Q, and for operating said holder and apron, substantially as and for the purpose set forth.

6. The holder R, having a lip, link R′, connecting one end of the holder with the frame, frame A, and means, substantially as described, connected with the other end of the holder, for imparting a rising and falling motion to the same, substantially as and for the purpose set forth.

7. The comb P, in combination with the stationary comb S, stripping-comb Q, and drum F, and means, substantially as described, for operating the combs P and Q and drum F, substantially as and for the purpose set forth.

8. The stationary comb S, in combination with the stripping-comb Q, holder R, and apron L′, and means, substantially as described, for operating said comb Q, holder, and apron, substantially as and for the purpose set forth.

9. A supply-apron and feed-drum, in combination with a rotary brush and mechanism, substantially as described, for operating said apron, drum, and brush, substantially as and for the purpose set forth.

10. The comb P, in combination with the frame A, the toothed segments P′ P², of elliptical form and meshing with each other, and mechanism, substantially as described, for operating the said segments, substantially as and for the purpose set forth.

11. A comb provided with teeth having a body or shank of a single piece and bifurcated working ends, substantially as and for the purpose set forth.

12. A feed-drum provided with teeth having a body or shank of a single piece and bifurcated working ends, substantially as and for the purpose set forth.

13. A tooth formed of a shank with bifurcated ends, substantially as and for the purpose set forth.

14. A supply or feed apron, in combination with a feed-drum, two combs having means for imparting elliptical motions thereto, a comb having means for oscillating the same, and for imparting a variable speed thereto during each oscillation thereof, a stripping-comb, a stationary comb, a holder, a discharge-apron, and mechanism, substantially as described, for operating said feed-apron, drum, stripping-comb, holder, and discharge-apron, substantially as and for the purpose set forth.

15. A feed-apron and a heater therefor, in combination with a drum, and means, substantially as described, for imparting an intermittent motion thereto, straightening-combs, stripping and holding devices, a discharge-apron, and a brush for the return of escaping material, and means, substantially as described, for operating the said movable parts, substantially as described.

JEAN TH. LEMAIRE.

Witnesses:
JOHN A. WIEDERSHEIM,
A. P. GRANT.